United States Patent [19]

Solt et al.

[11] Patent Number: 5,084,185

[45] Date of Patent: Jan. 28, 1992

[54] METHOD OF ION EXCHANGE

[75] Inventors: George S. Solt, Olney; Andrzej W. Nowosielski-Slepowron, Lydney, both of United Kingdom

[73] Assignee: The South Staffordshire Waterworks Company, Wallsall, England

[21] Appl. No.: 377,582

[22] Filed: Jul. 10, 1989

[30] Foreign Application Priority Data

Jul. 18, 1988 [GB] United Kingdom ............... 8817083

[51] Int. Cl.$^5$ ............................................. C02F 1/42
[52] U.S. Cl. ................................. 210/672; 210/677; 210/683; 210/903
[58] Field of Search ............... 210/672, 677, 683, 903, 210/670

[56] References Cited

U.S. PATENT DOCUMENTS

| 2,754,261 | 7/1956 | Akeroyd | 210/677 |
| 3,645,921 | 2/1972 | Salem et al. | 210/677 |
| 4,479,877 | 10/1984 | Guter | 210/683 |

Primary Examiner—Ivars Cintins
Attorney, Agent, or Firm—Wolf, Greenfield and Sacks

[57] ABSTRACT

The present invention relates to a method of reducing the concentration of contaminant ions, preferably nitrates ions, in impure water. The method comprises steps of: a) passing the impure water through an ion exchange resin to substitute regenerant ions from the resin for dissolved contaminant ions; b) passing a relatively dilute aqueous solution of wash-out ions through said resin to substitute wash-out ions for contaminant ions bound to the resin and; c) passing a relatively concentrated aqueous solution of regenerant ions through said resin to substitute regenerant ions for wash-out ions bound to the resin. The affinity of the resin to wash-out ions diminishes from being greater than that for contaminant and regenerant ions when exposed to a relatively dilute ionic solution to being less than that for said contaminant and regenerant ions when exposed to a relatively concentrated ionic solution. The method allows simplified ion exchange apparatus to be utilized, since the raw water, wash-out solution and regenerant solution may all be passed through the ion exchange resin in the same direction.

28 Claims, No Drawings

METHOD OF ION EXCHANGE

DESCRIPTION

The present invention relates to an improved method of ion exchange and to apparatus for carrying out said method. In particular, the present invention relates to a method of removing ionic impurities from water, using an ion exchange resin to remove the unwanted ions from solution.

In a conventional ion exchange process, water containing a solution of a contaminant first ionic species is passed through a column of ion exchange resin, said first ionic species becomes bound to the resin and, the resin releases into solution a second ionic species, which had previously been bound to the resin. The resin has a greater affinity for the first species than the second species and the second species is not considered a contaminant when the water is used for its intended purpose. Alternatively, the second species maybe hydroxide or hydroxyl Once the resin becomes fully loaded with the comtaminant species, it is regenerated by passing a concentrated solution of the second, or regenerant species through the column. The regenerant species displaces the contaminant species under these conditions primarily by mass action, because it is present in a very great excess. Thereafter, the resin may be used for further removal of the contaminant species. The identity of the first and second ionic species may be varied, so long as the resin will bind to the first or contaminant species in preference to the second or regenerant species, unless the water surrounding the resin has a large excess of the regenerant species dissolved therein, as it has during regeneration. More than one contaminant species may be present in the water prior to treatment and more than one regenerant species may be employed on the same column, so long as the resin's affinity for the contaminant species is greater than its affinity for the regenerant species.

The removal of nitrate from water by anion exchange is well known. In such a process, the water to be denitrified is passed through a column of anion exchange resin. Most raw waters contain dissolved sulphates in addition to nitrates and standard ion exchange resins take up anions in the following order of preference: Sulphate-nitrate-chloride/bicarboonate (the affinities for chloride and bicarbonate do not differ greatly). Other resins exhibit different orders of preference; for example so called Nitrate selective resins show a reversed order of preference to the foregoing. When the nitrate content of the water leaving the column exceeds the desired level, the resin is fully loaded and the run is interrupted and the column has to be regenerated.

A column of standard resin may be regenerated with a strong chloride solution, normally in the form of sodium chloride. Following regeneration with chloride, all the ions removed from the water being treated in the subsequent run, are replaced by chloride. This may yield an unacceptably high chloride concentration in the final water composition. The ratio of dissolved bicarbonate to chloride should be maintained at or above 2:1 (the bicarbonate being more abundant) to avoid the dezincification of brass plumbing fittings by chloride. Therefore, where required, partial regeneration with bicarbonate in addition to chloride is used, to improve the quality of the product water. The object of regeneration, therefore, is to restore the column as far as economically possible to the chloride or the chloride and bicarbonate form, before the next product run.

For chemical economy, only a part of the total available ion exchange capacity of a given resin is normally regenerated. However, even under such a regime, the regeneration procedure still requires an excess of regenerant. It therefore produces a waste which contains the sulphate and nitrate removed from the water, plus a substantial amount of surplus chloride (and possibly bicarbonate) regenerant.

This waste of substantial quantities of regenerant raises the costs of the process, both with respect to the demand for regenerant chemicals and with respect to the disposal of the spent effluent. Disposal can present serious difficulties in some locations, where the possiblity of spent regenerant being put on the land, or otherwise disposed of to the environment is undesirable and may be restricted. It is the high chloride content of the spent effluent, which usually prevents disposal of spent regenerant into the enviroment.

The problem is particularly acute with waters containing a high sulphate to nitrate ratio. The standard resin removes sulphate before nitrate, which reduces the resin's effective capacity for nitrate, shortens production runs, increases the regenerant demand and the amount of spent regenerant for disposal. Nitrate specific anion resins which have been developed specifically to overcome this difficulty only overcome it in part and, also show a reduced capacity for nitrate in the presence of large amounts of sulphate in the water.

According to the present invention there is provided a method of reducing the concentration of contaminant ions in impure water said method comprising the cycle of:

(a) passing said impure water through an ion exchange resin to substitute regenerant ions from the resin for dissolved contaminant ions, thereby reducing the concentration of said contaminant ions in the water;

(b) passing a relatively dilute aqueou solution of wash-out ions through said resin to substitute wash-out ions for contaminant ions bound to the resin and;

(c) passing a relatively concentrated aqueous solution of regenerant ions through said resin to substitute regenerant ions for wash-out ions bound to the resin; wherein the affinity of the resin to wash-out ions diminishes from being greater than that for contaminant and regenerant ions when exposed to a relatively dilute ionic solution, to being less than that for said contaminant and regenerant ions when exposed to a relatively concentrated ionic solution The term "wash-out ions" is used to define an ionic species having properties with respect to any ion exchange resin, regenerant ionic species, or contaminant ionic as set out above. This is a well known property of polyvalent ions, however it and the present invention are not limited to such ions.

The resin used in the method of the present invention may be a standard ion exchange resin, however the invention is not limited to the use of such a resin and any form of resin whose properties allow the practice of the inventive method, may be employed Since the method of the present invention takes advantage of differences in the resin's affinity to different ionic species during steps (b) and (c), as opposed to relying on a significant excess of regenerant ions to force the contaminant ions out of the resin, by mass action, considerably less regenerant material is required. This both reduces chemical costs and the problem of disposing of the spent effluent. The latter being especially important where the regenerant ion is environmentally undesirable, such as chloride.

Preferably, the affinity of the resin to bind both contaminant and regenerant ions is substantially insensitive to variations in the total ionic concentration in solution about the resin and the water to be treated may be contaminated with wash-out ions as a second contaminant species, which ions are exchanged for regenerant ions during step (a), the purification step. Advantagously, when the wash-out ions are present in the contaminated water, step (b), the wash-out step, may comprise a continuation of the purification step after the concentration of contaminant ion has risen above a predetermined level, above which the water would not be suitable for its intended use.

Advantageously, the solution of wash-out ions is passed through the resin in the same direction as the impure water in the purification step (a). The solution of regenerant ions also may be passed through the resin during the regenerant step (c) in this same direction. Passing all the solutions through the resin in the same direction, known as "co-flow" operation, allows considerable simplifications to be made in the apparatus employed to carry out the method of the present invention. Hence said apparatus is more easily constructed and costs less to construct. Additionally, operating the resin in co-flow causes the ionic composition of the treated water to remain relatively stable over time and thus easier to deal with.

In an embodiment, all said ions are anions and preferably, the wash-out ions are poly-or divalent. Furthermore, a plurality of contaiminant ions of different species may be present and additional regenerant ions of differing species may be empolyed, so long as the affinity of the resin to any species of contaiminant ion is greater than its affinity to any species of regenerant ion and, the affinity of the resin to the wash-out ions varies above and below its affinity to the contaminant and regenerant ions in the manner set out above.

In a most preferred embodiment the contaminant ions are nitrate, possibly in admixture with sulphage, and the wash-out ions are sulphate. The regenerant ions are preferably chloride, possibly followed by bicarbonate or in admixture therewith.

The methods of the presebnt invention are particularly suited to treating water which contains up to 10 mg equivalents perlitre of each specific ionic contaminant species. The concentration of wash-out ions is preferably up to 40 mg equivalents per litre and more preferably up to 30 mg equivalents per litre. The concentration of regenerant ions should be over 500mg equivalents per litre and preferably over 1000mg equivalents per litre.

In a second aspect, the present invention provides apparatus for carrying out the method of the first aspect of the invention. In embodiments of the second aspect, apparatus is provided for carrying out the embodiments of the first aspect set out herein.

This invention finds a particular application in the denitrification of water, minimises the difficulties otherwise experienced in denitrifying water and is especially applicable to those waters containing substantial amounts of sulphate. The affinity of ion exchange resins for sulphate ions is a function of this ion's bivalent nature, and its high affinity at low total ionic concentrations diminishes rapidly at high total ionic concentrations. In fact, regeneration with concentrated brine removes sulphate quite readily, whereas mono-valent nitrate, whose affinity is substantially unaffected by the total ionic concentration, is less easily removed.

The sulphate-containing solution used for the wash-out step may be obtained in various ways. Given a raw water with a high sulphate:nitrate content, the simplest method is to continue the purification step past its determination point, running the product to waste, and using the resin's high affinity for sulphate to load it with more sulphate in place of nitrate. However, this is wasteful in water and time. In the regeneration following the wash-out step, the sulphate loaded resin is so easily regenerated, that the early and middle portions of the resulting eluate contain almost no excess regenerant and the anionic content is almost entirely sulphate. Thus a fraction of this eluate may be recovered as a source of sulphate for the wash-out step in the following cycle.

In one method, this recovered sulphate may be added to the raw water to enhance its sulphate content, but at a sufficiently low concentration for the resin's affinity for sulphate to remain high. This device reduces the waste of both water and time, as compared with using only raw water for the wash-out step, a similar result is nevertheless achieved.

Alternatively, recovery of spent eluate in the manner set out above, in some cases may produce such an abundance of sulphate that, even if the recovered solution is applied at or near its full strength, the excess of sulphate available will be sufficient to load the resin to the desired level through the mass action of the excess sulphate. This reduces the waste of water and time even further.

The wash-out step may be applied in co-flow or counter-flow (i.e the same direction of flow as the water being denitrified, or the opposite direction, respectively). In normal conditions co-flow appears to give better results. The wash-out step may be performed by either of these methods, provided the supply of sulphate and its concentration are such that the resin is converted substantially to the sulphate form. After a wash-out step by either of these methods, the desired degree of regeneration can be achieved with a much smaller excess of regenerant than would have been the case without the wash out step.

The ease with which sulphate-loaded resin may be regenerated may be exploited further. In conventional denitrification by ion exchange, counter-flow regeneration is frequently required in order to obtain the necessary degree of regeneration at the exit end of the column, in order to yield a product water whose residual nitrate content is acceptable. The method of the present invention allows the desired product quality to be obtained with an economical quantity of regenerant applied in co-flow, after the wash-out step, which is simpler and uses a less costly type of ion exchange apparatus.

In cases where water quality considerations call for the resin to be regenerated with bicarbonate as well as chloride, the bicarbonate conventionally has been applied to the resin separately, after the chloride. After a wash-out step in accordance with the present invention however, the ease with which sulphate is displaced, makes it possible to use a mixed chloride and bicarbonate regenerant, which simplifies the procedure and reduces the bulk of waste regenerant for disposal.

In a most preferred embodiment, the impure water includes nitrate and sulphate contaminant ions, the solution of regenerant ions includes chloride and bicarbonate ions, and at least a portion of the solution derived from the resin in the regenerant step (c), which includes sulphate and bicarbonate ions, is used as a source of sulphate regenerant ions. This solution may be used as a source of sulphate wash-out ions because substantially no chloride ions are passed out of the resin during regeneration and, the bicarbonate ions are not taken up readily by the resin in the presence of sulphate ions. Once the resin is in the sulphate form, after wash-out, the take-up by the resin of bicarbonate is enhanced, thus allowing the use of chloride and bicarbonate ions together in the regeneration step (c).

The following example illustrates the advantage of the present invention over conventional methods.

EXAMPLE 1

Water containing 3.0 mg equivalents per litre of sulphate, 1.5 mg equivalents per litre of nitrate and 1 mg equivalents per litre of bicarbonate and chloride respectively was denitrified using a column containing 1 litre of type II macro-reticular anion exchange resin. In all runs the regenerant used was 1 litre of 1000 mg equivalents per litre sodium chloride solution, applied in counter-flow. All production runs were terminated when the nitrate concentration in the product water rose to 0.8 mg equivalents per litre. After three cycles of run and regeneration, the operation of the resin was considered to have stabilized and the volume of water produced was recorded.

When operated conventionally, with alternate production runs and regeneration runs, each production run produced 129 litres of water.

A second series of trials was then run with an intermediate wash-out step carried out at the end of each production run. In each intermediate wash-out step 33 litres of untreated water, having a sulphate content increased to 26 mg equivalents per litre were passed through the resin. With the wash-out step, each production run produced 171 litres of water. Furthermore, the spent eluate in the control series, that is without any wash-out step, contained 473 mg equivalents of surplus chloride; whereas with the wash-out step, the surplus chloride from the regenerant step was reduced to 280 mg equivalents per litre.

EXAMPLE 2

A water of the composition given below was treated in a column containing 1 litre of Amberlite IRA 910, a conventional macroporous Type II anion exchange resin. The cycle was designed to yield a product of such a quality that when mixed in equal proportions with untreated water, the resulting blend would always contain less than 0.8 mg equiv/1 of nitrate, and whose content of bicarbonate would always be at least twice that of chloride, measured in equivalent units.

To achieve this objective, the exchanger was treated with a washout which contained all the spent regenerant from the previous cycle, diluted by rinse water, and further diluted with raw water. Regeneration was in two stages, a chloride solution being followed by a bicarbonate solution. Both washout and regeneration were in co-flow. The column was operated for a number of cycles for the resin and solutions to reach a kinetic equilibrium.

The volumes in litres and concentrations in milligram equivalents./litre (meg/1, referring to bulked samples) which were obtained in this way are given in the table below.

|  | Raw Water | Washout | Regenerant Chloride Stage | Bicarbonate Stage | Out (diluted with rinse) |
|---|---|---|---|---|---|
| VOLUME (litres) | 300 | 25 | 0.5 | 0.75 | 3.25 |
| ANION CONCENTRATIONS (meg/1) | | | | | |
| Cl— | 0.85 | 1.4 | 1130 | 0.1 | 15 |
| SO4— | 1.21 | 32 | 0.1 | 0.1 | 255 |
| NO3— | 1.06 | 1.0 | 0.1 | 0.1 | 8.3 |
| HCO3— | 3.28 | 1.5 | 0.1 | 480 | 13.4 |

As all the spent regenerant was re-used for washout, the sole effluent for disposal from this was 25 litres of washout, with a composition:

| ANION | meg/1 |
|---|---|
| Cl— | 6.3 |
| SO4— | 11.8 |
| NO3— | 8.2 |
| NCO3— | 9.1 |

To achieve the quality specification for the product water by conventional direct regeneration would require roughly 50% higher regenerant usage, calculated in terms of cost to allow for both chloride and bicarbonate.

EXAMPLE 3

A water of the composition set out below was treated with a column containing 1 litre of Amberlite IRA 910 (see Example 2). A fraction of the spent regenerant was retained and diluted with raw water to make up washout for the following run. Regeneration was with sodium chloride in counterflow, and the column operated in such a way that the product always contained less than 0.8 meg/1 of nitrate. The unit was operated for several cycles in order to establish a stable working equilibrium, when the following quantities and concentrations were observed:

|  | Raw Water | Washout | Regenerant |
|---|---|---|---|
| VOLUME (litres) | 269 | 33 | 1 |
| ANION CONCENTRATIONS (meg/1) | | | |
| Cl— | 1.16 | 1.16 | 1000 |
| SO4— | 2.2 | 25.0 | 2 |
| NO3— | 1.06 | 1.1 | 1 |
| HCO3— | 0.93 | 0.93 | 1 |

The product water contained on average 0.47 meg/1 of nitrate, so that the net removal was equivalent to 0.59 meg/1, i.e. 159 meg for the whole run. This nitrate capacity is equivalent to 16% of the NaCl regenerant applied. Conventional regeneration to achieve a similar product from a water so high in sulphate would take about 50% more NaCl regenerant.

We claim:
1. A method of reducing the concentration of containment ions of nitrate, or nitrate in admixture with sulphae, in impure water, said method comprising the cycle of:
   (a) passing said impure water through an ion exchange resin to substitute regenerat ions from the resin for dissolved contaminant ions, thereby re- ducing the concentration of said contaminant ions in the water;

(b) passing a relatively dilute aqueous solution of wash-out sulphate ions through said resin to substitute wash-out ions for contaiminant ions bound to the resin; and (c) passing a relatively concentrted aqueous solution of regenerat ions of chloride, or chlorine followed by or in admixture with bicarbonate ions, through said resin to substitute regenerat ions for wash-out ions bound to the resin;

wherein the affinity of the resin to wash-out ions diminishes from being greater than that for contaiminant and regenerant ions when exposed to a relatively dilute ionic solution to being less than that for said contaminant and regenerant ions when exposed to a relatively concentrated ionic solution, said resin exhibiting the following order of affinity for anionic species when exposed to a relatively dilute ionic solution; sulphate $>$ nitriat $>$ chloride $\geqq$ bicarbonate, and wherein the impure water includes nitrate and sulphate contaminant ions, the solution of regerant ions includes chlordie and bicarbonate ions, and a solution derived from the resin in the regenerant step (c) which includes sulphate and bicarbonate ions, is used as a solution of sulphate wash-out ions in the wash-out step (b).

2. A method of reducing the concentration of nitrate ions in raw water, said method comprising the cycle of:

(a) passing the said raw water through an ion exchange resin to substitute regeneratnt ions from the resin for dissolved nitrate ions, thereby reducing the concentration of said nitrate ions in the water;

(b) passing a relatively dilute aqueous solution of sulphate wash-out ions through said resin to substitute wash-out ions for nitrate ions bound to the resin; and (c) passing a relatively concentrated aqueous solution of regenerant ions of chlordie or bicarbonate ions, through said resin to substitute regenerant ions for wash-out ions bound to the resinl;

wherein the affinity of the resin to wash-out ions diminishes from being greater than that for nitrate and regenerant ions when exposed to relatively dilute ionic solution to being less than that for nitrate and rgenerant ions when exposed to a relatively concentrated ionic solution, and wherein at least a portion of the solution pased out from the resin during the regeneration step (c) is recovered and used as a solution of sulphate ions in a subsequent wash-out step (b).

3. A method as claimed in claim 22, wherein said recovered solution is diluted with raw water, prior to use a a solution of sulphate wash-out ions.

4. A method of reducing the concentrtion of nitrate ions in raw water, said method comprising the cycle of:

(a) passing the said raw water through an ion exhcange resin to substitute regenerant ions from the resin for dissolved nitrate ions, thereby reducing the concentration of said nitrate ions in the water;

(b) passing a relatively dilute aqueous solution of wash-out ions through said resin to substitute wshout ions for nitrate ions bound to the resin; and (c) passing a relatively concentrated aqueous solution of regenerant ions through said resin to substitute regenerant ions for wash-out ions bound to the resin;

wherein the affinity of the resin to wash-out ions diminishes from being greater than that for nitrate and regenerant ions when exposed to relatively dilute ionic solution to being less than that for nitrate and regenerant ions when exposed to a relatively concentrated ionic solution, and wherein the resin exhibits the following order of affinity for ionic species when exposed to relatively dilute ionic solution: sulphate $>$ nitrate $>$ chloride $\geqq$ bicarbonate.

5. A method of reducing the concentration of nitrate ions in impure water, said method comprising the cycle of:

(a) passing said impure water through an ion exhcange resin to substitute regeneratn ions, selected from the group consisting of chloride and bicarbonate, from the resin for dissolved nitrate ions, thereby reducing the concentration of said nitrate ions in the water;

(b) passing a relatively dilute aqueous solution of polyvalent wash-out ions through said resin to substitute polyvalent wash-out ions for nitrate ions bound to the resin and;

(c) passing a relatively concentrated aqueous solution of said regenerant ions through said resin to substitute regenerant ions for polyvalent wash-out ions bound to the resin;

wherein the affinity of the resin to said polyvalent wash-out ions diminishes from being greater than that for nitrate and said regenerant ions when exposed to a relatively dilute ionic solution, to being less than that for nitriate and said regenerant ions when exposed to a relatively concentrated ionic solution.

6. A method as claimed in claim 5, wherein the affinity of the resin to bind both nitrate and said regenerant ions is substantially insensitive to varitions in the total ionic concentration in solution about the resin.

7. A method as claimed in claim 5, wherein the water to be treated is contaminated with polyvalent wash-out ions as a second contaminant species, which ions are exchanged for regenerant ions during the purificiation step (a).

8. A method as claimed in claim 7, wherein the wash-out step (b) comprises a continuation of the purification step, after the concentration of nitrate ions passing out of the resin has risen above a predetermined level.

9. A method as claimed in claim 7, wherein both chloride and bicarbonate ions are used as regenerant ions.

10. A Method as claimed in claim 5, wherein at least a portion of the solution passed out from the resin during the regenration step (c) is recovered and used as a solution of polyvalent wash-out ions in a subsequent wsh-out step (b).

11. A method as claimed in claim 10, wherein said recovered solution is diluted, with impure water, prior to use as a solution of polyvalent wash-out ions.

12. A method as claimed in claim 5, wherein the resin is packed in a column and the solutio of polyvalent wash-out ions is passed through the resin along the column in the same direction as the impure water in the purfication step (a).

13. A method as claimed in claim 12, wherein the solution of said regenerant ions is passed through the resin along the column during the regeneration step (c) in the same direction as the solution of polyvalent wash-out ions.

14. A method of reducing the concentration of contaminant ions in impure water, said method comprising the cycle of:
  (a) passing said impure water through an ion exhdange resin to substitute regenerant ions from the resin for dissolved contaminant ions, thereby reducing the concentration of said contaminant ions in the water;
  (b) passing a relatively dilute aqueous solution of wash-out ions through said resin to substitute wash-out ions for contaminant ions bound to the resin; and
  (c) passing a relatively concentrted aqueous solution of regenerant ions through said to substitute rgenerant ions for wash-out ions bound to the resin;
  wherein the affinity of the resin to wash-out ions diminishes from being greater than that for contaminant and regenerant ions when exposed to a relatively dilute ionic solution to being less than that for said contaiminant and regenerant ions when exposed to a relatively concentrated ionic solution, and
  wherein the concentration of polyvalent wash-out ions is up to 40 met/l.

15. A method as claimed in claim 14, wherein the concentration of said regenerant ions is over 500 meg/l.

16. A method of reducing the concentration of nitrate ions in impure water, said method comprising the cycle of:
  (a) passing said impure water through an ion exchange resin to substitute regenerant ions, selected from the group consisting of chloride and bicarbonate ions, from the resin for dissolved nitrate ions, thereby reducing the concentratio of nitrate ions in the water;
  (b) passing a relatively dilute aqueous solution of sulphate ions through said resin to substitute sulphate ions for nitrate ions bound to the resin and;
  (c) passing a relatively concentrated aqueous solution of said regenerant ions through said resin to substitute said regenerant ions for sulphate ions bound to the resin:
  wherein the affinity of the resin to sulphate ions diminishes from being greater than that for nitrate and said regenerant ions when exposed to a relatively dilute ionic solution, to being less than that for nitrate and said regenerant ions when exposed to a realtively concentrated ionic solution.

17. A method as claimed in claim 6, wherein the affinity of the resin to bind both nitrate and said rgenerant ions is substantially insensitive to variations in the total ionic concentration in solution about the resin.

18. A method as claimed in claim 16, wherein the water to be treated is contaminated with sulphate ions as a second contaminant species, which sulphate ions are exchanged for regenerant ions during the purification step (a).

19. A method as claimed in claim 18, wherein the wash-out step (b) comprises a continuation of the purification step after the concentration of the nitrate ions passing out f the resin has risen above a predetermined level.

20. A method as claimed in claim 18, wherein both chloride and bicarbonate ions are used a regenerant ins.

21. A method as claimed in claim 16, wherein at least a portion of the solution passed out from the resin during the regeneration step (c) is recovered and used as a solution of sulphate ions, in a subsequent wash-out step (b).

22. A method as claimed in claim 21, wherein said recovered solutio is diluted with impure water, prior to use as a solution of sulphate ions.

23. A method as claimed in claim 16, wherein the concentration of sulphate ions is up to 40 meg/l.

24. A method as claimed in claim 23, wherein the concentration of said regenerant ions is over 500 meg/l.

25. A method as claimed in claim 16, wherein the resin is packed in a column and the solution of sulphate ions is passed through the resin along the column in the same direction as the impure water in the purification step (a).

26. A method as claimed in claim 25, wherein the solution of said regenerant ions is passed through the resin along the column during the regeneration step (c) in the same direction as the solution of sulphate ions.

27. A method as claimed in claim 16, wherein the resin exhibits the following order of affinity for ionic species when exposed to a relatively dilute ionic solution; sulphae > nitrate > chloride ≧ bicarbonate.

28. A method as claimed in claim 27, wherein the impure water includes nitrate and sulphate contaminant ions, the solution of regenerant ions includes chloride and bicarbonate ions, and a solution derived from the resin in the regenerant step (c) which includes sulphate and bicarbonate ions, is used as a solution of sulphate wash-out ions in the wash-out step (b).

* * * * *

UNITED STATES PATENT AND TRADEMARK OFFICE
CERTIFICATE OF CORRECTION

PATENT NO. : 5,084,185

DATED : January 28, 1992

INVENTOR(S) : George S. Solts, Andrzej W. Nowosielski-Slepowron

It is certified that error appears in the above-identified patent and that said Letters Patent is hereby corrected as shown below:

```
Column 1, line 21 after "hydroxyl" insert -- . --.
Column 1, line 46 change "bicarboonate" to -- bicarbonate --.
Column 2, line 39 change "aqueou" to -- aqueous --.
Column 2, line 44 after "resin;" and before "wherein" begin a
   new paragraph
Column 3, line 33 change "contaiminant" to -- contaminant --.
Column 3, line 35 change "empolyed" to -- employed --.
Column 3, line 36 change "contaiminant" to -- contaminant --.
Column 3, line 42 change "sulphage" to -- sulphate --.
Column 3, line 46 change "presebnt" to -- present --.
Column 3, line 48 change "perlitre" to -- per litre --.
Column 6, lines 62 and 63 change "containment"
   -- contaminant --.
Column 6, line 64 change "sulphae" to -- sulphate --.
Column 6, line 67 change "regenerat" to -- regenerant --.
Column 7, line 5 change "contaiminant" to -- contaminant".
Column 7, line 7 change "concentrted" to -- concentrated --.
Column 7, line 8 change "regenerat" to -- regenerant --.
Column 7, line 10 change "regenerat" to -- regenerant --.
Column 7, lines 13 and 14 change "contaiminant" to
   -- contaminant --.
Column 7, line 20 change "nitriat" to -- nitrate --.
Column 7, line 23 change "regerant" to -- regenerant --.
Column 7, line 24 change "chlordie" to -- chloride --.
Column 7, line 32 change "regeneratnt" to -- regenerant --.
Column 7, line 40 change "chlordie" to -- chloride --.
Column 7, line 42 change "resinl" to -- resin --.
Column 7, line 47 change "rgenerant" to -- regenerant --.
Column 7, line 49 change "pased" to -- passed --.
Column 7, line 53 change "22" to -- 2 --.
```

UNITED STATES PATENT AND TRADEMARK OFFICE
CERTIFICATE OF CORRECTION

PATENT NO. : 5,084,185

DATED : January 28, 1992

INVENTOR(S) : George S. Solts, Andrzej W. Nowosielski-Slepowron

It is certified that error appears in the above-identified patent and that said Letters Patent is hereby corrected as shown below:

```
Column 7, line 55 change "a a" to -- a --.
Column 7, line 56 change "concentrtion" to -- concentration --.
Column 7, lines 58 and 59 change "exhcange" to -- exchange --.
Column 7, line 63 change "wsh-" to -- wash- --.
Column 8, lines 14 and 15 change "exhcange" to -- exchange --.
Column 8, line 15 change "regeneratn" to -- regenerant --.
Column 8, line 32 change "nitriate" to -- nitrate --.
Column 8, line 37 change "varitions" to -- variations --.
Column 8, line 42 change "purificiation" to -- purification --.
Column 8, line 51 change "Method" to -- method --.
Column 8, line 53 change "regenration" to -- regeneration --.
Column 8, line 60 change "solutio" to -- solution --.
Column 9, lines 4 and 5 change "exhcange" to -- exchange --.
Column 9, line 13 change "concentrted" to -- concentrated --.
Column 9, line 14 after "said" insert -- resin --, and lines
   14 and 15 change "rgenerant" to -- regenerant.
Column 9, line 20 change "contaiminant" to -- contaminant --.
Column 9, line 24 change "met/l" to -- meg/l --.
Column 9, line 34 change "concentratio" to -- concentration --.
Column 9, line 48 change "realtively" to -- relatively --.
Column 10, line 1 change "6" to -- 16 --.
Column 10, lines 2 and 3 change "rgeneratant" to
   -- regenerant --.
Column 10, line 13 change "f" to -- of --.
Column 10, line 16 change "a" to -- as -- and "ins." to
   -- ions. --.
Column 10, line 22 change "solutio" to -- solution --.
```

Page 2 of 3

UNITED STATES PATENT AND TRADEMARK OFFICE
CERTIFICATE OF CORRECTION

PATENT NO. : 5,084,185

DATED : January 28, 1992

INVENTOR(S) : George S. Solts, Andrzej W. Nowosielski-Slepowron

It is certified that error appears in the above-indentified patent and that said Letters Patent is hereby corrected as shown below:

Column 10, line 41 change "sulphae" to -- sulphate --.

Signed and Sealed this

Twentieth Day of July, 1993

Attest:

MICHAEL K. KIRK

Attesting Officer    Acting Commissioner of Patents and Trademarks